United States Patent
Paczkowski et al.

(10) Patent No.: US 8,681,626 B1
(45) Date of Patent: Mar. 25, 2014

(54) TRANSLATION OF CONGESTION NOTIFICATION INDICATORS IN A BASE STATION SYSTEM

(75) Inventors: Lyle Walter Paczkowski, Mission Hills, KS (US); Pallavur Sankaranaraynan, Overland Park, KS (US); Bejoy Pankajakshan, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 893 days.

(21) Appl. No.: 12/707,460

(22) Filed: Feb. 17, 2010

(51) Int. Cl.
*G01R 31/08* (2006.01)

(52) U.S. Cl.
USPC .......................... 370/235; 370/328; 370/469

(58) Field of Classification Search
USPC ............. 370/230, 230.1, 231, 235, 252, 328, 370/338, 466, 469
See application file for complete search history.

(56) References Cited

U.S. PATENT DOCUMENTS

| | | | |
|---|---|---|---|
| 6,052,371 A | 4/2000 | Lemieux | |
| 6,205,143 B1 | 3/2001 | Lemieux | |
| 6,256,503 B1 | 7/2001 | Stephens | |
| 6,275,943 B1 | 8/2001 | Pentikainen et al. | |
| 6,359,871 B1 | 3/2002 | Chung et al. | |
| 6,377,982 B1 * | 4/2002 | Rai et al. ................ | 709/217 |
| 6,708,031 B2 | 3/2004 | Purnadi et al. | |
| 6,747,986 B1 | 6/2004 | Charas et al. | |
| 6,853,894 B1 | 2/2005 | Kolls | |
| 6,894,994 B1 | 5/2005 | Grob et al. | |
| 6,999,435 B2 | 2/2006 | Perras | |
| 7,027,818 B2 | 4/2006 | Bos et al. | |
| 7,099,655 B2 | 8/2006 | Song et al. | |
| 7,133,513 B1 | 11/2006 | Zhang | |
| 7,146,153 B2 | 12/2006 | Russell | |
| 7,146,453 B2 | 12/2006 | Shyam et al. | |
| 7,187,923 B2 | 3/2007 | Mousseau et al. | |
| 7,420,951 B1 | 9/2008 | Mizell et al. | |
| 7,545,868 B2 | 6/2009 | Kennedy et al. | |

(Continued)

FOREIGN PATENT DOCUMENTS

| | | |
|---|---|---|
| CA | 2609101 | 11/2006 |
| EP | 0917320 | 5/1999 |

(Continued)

OTHER PUBLICATIONS

European Patent Office, "Communication under Rule 71(3) EPC," Dec. 18, 2009, 25 pages, European Patent Office, Munich, Germany.

*Primary Examiner* — Ricky Ngo
*Assistant Examiner* — Christine Ng

(57) ABSTRACT

A base station system comprises a processing system, an IP communication interface, and a wireless communication interface. The processing system is configured to direct the IP communication interface to establish communication connectivity over a communication link to a service node on a communication network, register with the service node over the communication link and the communication network, and establish a tunnel with the service node, direct the wireless communication interface to exchange user communications with a plurality of wireless communication devices in a wireless protocol, direct the IP communication interface to exchange the user communications with the service node over the tunnel and receive an IP layer three congestion notification indicator over the tunnel, process the IP layer three congestion notification indicator to generate a layer two congestion notification indicator in the wireless protocol, and direct the wireless communication interface to transfer the layer two congestion notification indicator in the wireless protocol to at least one wireless communication device.

20 Claims, 5 Drawing Sheets

(56) References Cited

U.S. PATENT DOCUMENTS

| | | |
|---|---|---|
| 7,586,876 B2 | 9/2009 | Chung et al. |
| 7,706,266 B2 * | 4/2010 | Plamondon ................... 370/230 |
| 2001/0044305 A1 | 11/2001 | Reddy et al. |
| 2002/0196763 A1 * | 12/2002 | Reynolds et al. ............. 370/338 |
| 2003/0211843 A1 | 11/2003 | Song et al. |
| 2004/0048601 A1 | 3/2004 | Lee et al. |
| 2004/0120283 A1 | 6/2004 | Rezaiifar et al. |
| 2004/0139044 A1 | 7/2004 | Rehwald |
| 2004/0236965 A1 | 11/2004 | Krohn |
| 2005/0089052 A1 | 4/2005 | Chen et al. |
| 2006/0023645 A1 | 2/2006 | Hench |
| 2006/0045049 A1 | 3/2006 | Chung et al. |
| 2006/0104313 A1 | 5/2006 | Haner et al. |
| 2006/0187900 A1 | 8/2006 | Akbar |
| 2006/0262745 A1 | 11/2006 | Johnson et al. |
| 2008/0076392 A1 | 3/2008 | Khetawat et al. |
| 2008/0076393 A1 | 3/2008 | Khetawat et al. |
| 2008/0076425 A1 | 3/2008 | Khetawat et al. |
| 2008/0261596 A1 | 10/2008 | Khetawat et al. |
| 2008/0305792 A1 | 12/2008 | Khetawat et al. |
| 2009/0109922 A1 | 4/2009 | Livanos |
| 2009/0190549 A1 | 7/2009 | Kim et al. |
| 2010/0003928 A1 * | 1/2010 | Tang et al. ..................... 455/72 |
| 2010/0074187 A1 * | 3/2010 | Sun et al. ...................... 370/329 |
| 2011/0032819 A1 * | 2/2011 | Schliwa-Bertling et al. . 370/229 |
| 2012/0092995 A1 * | 4/2012 | Arvidsson et al. ............ 370/235 |
| 2012/0208504 A1 * | 8/2012 | Song et al. .................... 455/411 |

FOREIGN PATENT DOCUMENTS

| | | |
|---|---|---|
| EP | 0987860 | 3/2000 |
| EP | 1882349 | 1/2008 |
| JP | 2008541666 | 11/2008 |
| WO | 0028714 | 5/2000 |
| WO | 03081552 | 10/2003 |
| WO | 2006124631 | 11/2006 |

* cited by examiner

TRANSLATION OF CONGESTION NOTIFICATION INDICATORS IN A BASE STATION SYSTEM

TECHNICAL BACKGROUND

For wireless communications, end-users operate wireless communication devices that exchange user communications in a wireless protocol with a base station system. The base station system then typically exchanges the user communications in a non-wireless format with a service node, such as a mobile switching center (MSC). The service node processes the user communications to provide a communication service, such as telephony voice communications or data access over the Internet. Typically, time-division multiplexing (TDM) links, such as digital signal 1 (DS1) or DS3 links, are used to exchange the user communications between the base station system and the service node. However, a given coverage area may lack a robust set of competing service providers that supply TDM links, resulting in poor service. In addition, a lack of base stations or the topology of the land can cause low radio frequency (RF) signal strength. As a result, some wireless service providers have released end-user devices such as femtocells to address these issues.

The demand for wireless communications is growing with respect to coverage and capacity. Newer data applications, such as video streaming and music downloads, have become popular features for wireless communication devices. However, the network bandwidth necessary to transfer this multimedia content may result in network congestion, which may lead to dropped packets and retransmission attempts, further congesting the network. One alternative to dropping packets is an explicit network congestion (ECN) message, which allows for end-to-end notification of network congestion without dropping packets.

Overview

A base station system comprises a processing system, an internet protocol (IP) communication interface, and a wireless communication interface. The processing system is configured to direct the IP communication interface to establish communication connectivity over a communication link to a service node on a communication network, register with the service node over the communication link and the communication network, and establish a tunnel with the service node over the communication link and the communication network. The processing system is further configured to direct the wireless communication interface to exchange user communications with a plurality of wireless communication devices in a wireless protocol and direct the IP communication interface to exchange the user communications with the service node over the tunnel and receive an IP layer three congestion notification indicator over the tunnel. The processing system is further configured to process the IP layer three congestion notification indicator to generate a layer two congestion notification indicator in the wireless protocol, and direct the wireless communication interface to transfer the layer two congestion notification indicator in the wireless protocol to at least one wireless communication device of the plurality of wireless communication devices.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
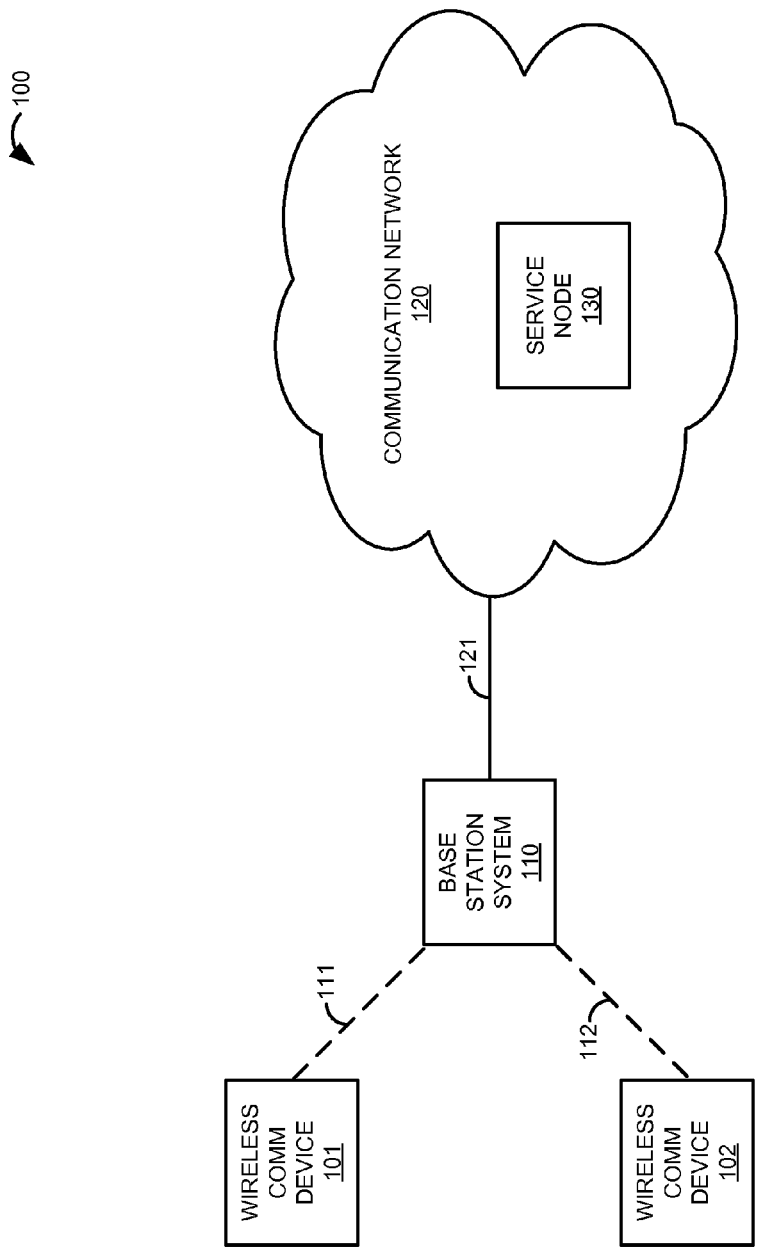
FIG. 1 is a block diagram that illustrates a communication system.

FIG. 1 is a block diagram that illustrates communication system 100. Communication system 100 includes wireless communication devices 101-102, base station system 110, and communication network 120. Communication network 120 includes service node 130. Wireless communication device 101 is in communication with base station system 110 over wireless communication link 111. Likewise, wireless communication device 102 is in communication with base station system 110 over wireless communication link 112. Base station system 110 communicates with communication network 120 and service node 130 over communication link 121.

Figure 2:
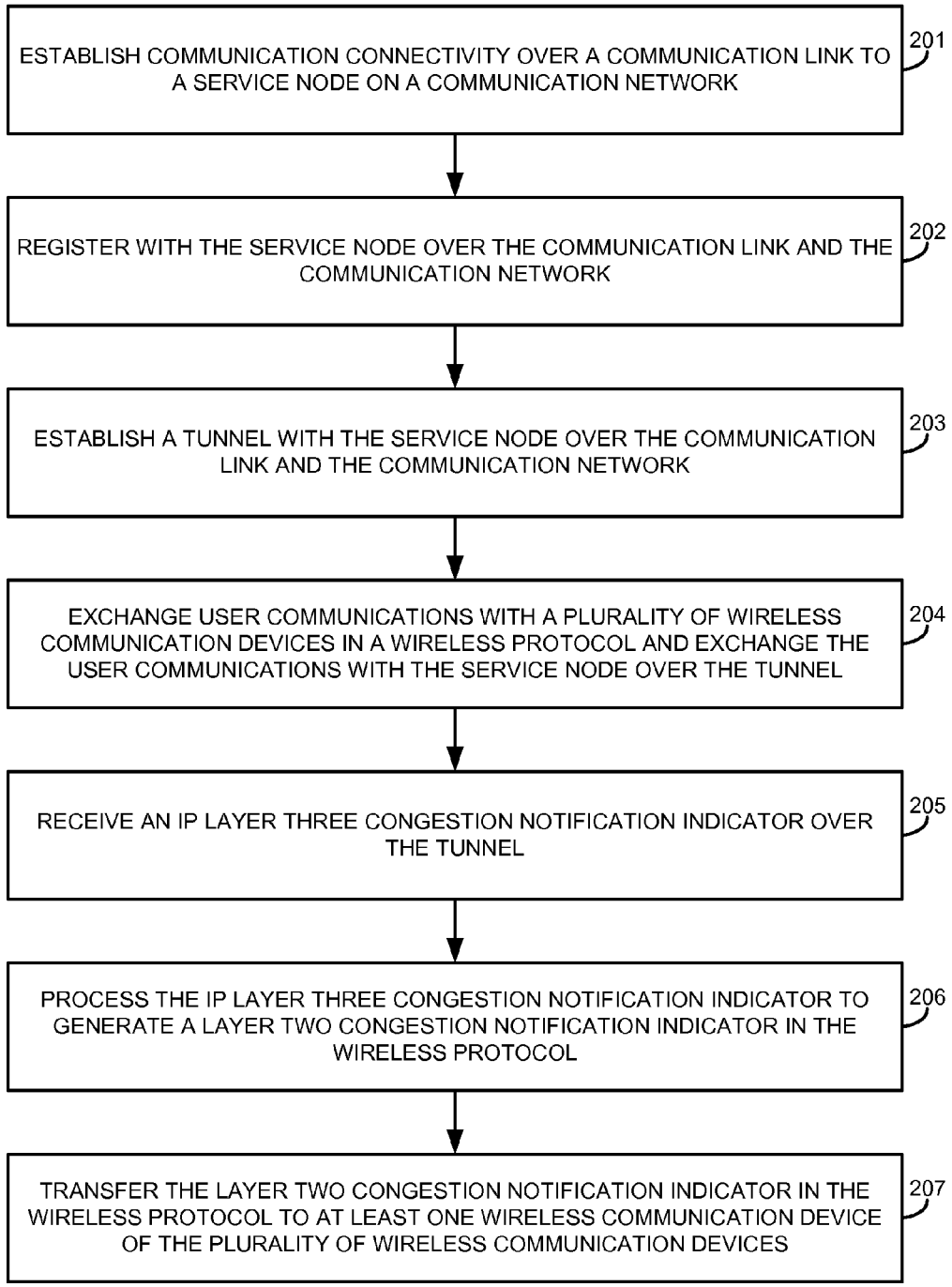
FIG. 2 is a flow diagram that illustrates an operation of a base station system in the communication system.

FIG. 2 is a flow diagram that illustrates an operation of base station system 110 in communication system 100. The steps of the operation are indicated below parenthetically. In FIG. 2, base station system 110 establishes communication connectivity over communication link 121 to service node 130 on communication network 120 (201).

Subsequent to establishing the communication connectivity, base station system 110 registers with service node 130 over communication link 121 and communication network 120 (202). During registration, service node 130 typically validates base station system 110. Validation typically includes authenticating base station system 110 by establishing positive identification, and confirming authorization of base station system 110 to register with service node 130. In some examples, base station system 110 and service node 130 are each programmed with a secret access code for base station system 110. In this case, service node 130 validates base station system 110 by obtaining the access code from base station system 110 during registration, and then checks the access code against a validation database to ensure the access code is associated with base station system 110 and that system 110 is entitled to register.

After successful registration, base station system 110 establishes a tunnel with service node 130 over link 121 and network 120 (203). Typically, the tunnel would comprise a secure IP tunnel. In this case, the security would be provided through encryption or some other technique of safeguarding communications.

Once the tunnel is established, base station system 110 exchanges user communications with a plurality of wireless communication devices 101-102 in a wireless protocol over wireless links 111-112 and exchanges the user communications with service node 130 over the tunnel (204). Some examples of user communications include telephony voice communications, video streaming, audio downloads, web browsing, email access, chat sessions, peer-to-peer file sharing, gaming applications, or any other data exchange. Service node 130 typically processes the user communications to provide a communication service to wireless communication device 101-102.

Base station system 110 receives an IP layer three congestion notification indicator over the tunnel (205). The IP layer three congestion notification indicator typically comprises a message contained within a header of the Internet layer of an IP packet. For example, the user communications could comprise multiple IP packets, and one or more of these packets could comprise the IP layer three congestion notification indicator received by base station system 110 over the tunnel. In some examples following the Open System Interconnection (OSI) Reference Model, the IP layer three congestion notification indicator could comprise indicator bits in the OSI layer three network layer. The IP layer three congestion notification indicator is typically intended to inform base station system 110 of communication congestion on communication link 121 or communication network 120, such as low available bandwidth caused by a high number of simultaneous data transfers, for example. In some examples, the IP layer three congestion notification indicator comprises an explicit congestion notification (ECN).

Base station system 110 processes the IP layer three congestion notification indicator to generate a layer two congestion notification indicator in the wireless protocol (206). The layer two congestion notification indicator informs wireless communication devices 101-102 of congestion on communication link 121 or communication network 120. In some examples, base station system 110 may generate the layer two congestion notification indicator in the wireless protocol by inserting the layer two congestion notification indicator into a link layer of the wireless protocol.

After generating the layer two congestion notification indicator, base station system 110 transfers the layer two congestion notification indicator in the wireless protocol to at least one wireless communication device 101 and/or 102 of the plurality of wireless communication devices 101-102 (207). Advantageously, wireless communication devices 101-102 that receive the layer two congestion notification indicator in the wireless protocol are informed of the communication congestion present on communication link 121 and/or communication network 120. In this manner, wireless communication devices 101-102 may typically perform an action in response to the layer two congestion notification indicator in the wireless protocol, whereas the communication congestion would otherwise go unnoticed by devices 101 and 102.

Referring back to FIG. 1, wireless communication devices 101 and 102 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101 and 102 may also include a user interface, memory device, software, processing circuitry, or some other communication components. For example, wireless communication devices 101 and 102 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101 and 102 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Internet, telephony, or any other wireless network protocol that facilitates communication between wireless communication devices 101 and 102 and base station system 110.

Base station system 110 comprises RF communication circuitry and an antenna. The RF communication circuitry typically includes an amplifier, filter, RF modulator, and signal processing circuitry. Base station system 110 may also comprise a router, server, memory device, software, processing circuitry, cabling, power supply, network communication interface, structural support, or some other communication apparatus. Base station system 110 could comprise a base station, femtocell, access point base station, Internet access node, telephony service node, wireless data access point, or some other wireless communication system—including combinations thereof. Wireless network protocols that may be utilized by base station system 110 include CDMA, GSM, UMTS, HSPA, EV-DO, EV-DO rev. A, 3GPP LTE, WiMAX, Wi-Fi, Internet, telephony, or some other communication format—including combinations thereof.

Communication network 120 comprises the core network of a wireless communication provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, metropolitan-area networks (MAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Service node 130 comprises a computer system and communication interface. Service node 130 may also include other components such as a router, server, data storage system, and power supply. Service node 130 may reside in a single device or may be distributed across multiple devices. Service node 130 may be a discrete system or may be integrated within other systems—including other systems within communication system 100. Service node 130 could comprise a packet gateway, mobile switching center, network gateway system, Internet access node, application server, service node, firewall, or some other communication system—including combinations thereof.

Wireless communication links 111 and 112 use the air or space as the transport medium. Wireless communication links 111 and 112 may use various protocols, such as CDMA, GSM, UMTS, HSPA, EV-DO, EV-DO rev. A, 3GPP LTE, WiMAX, Wi-Fi, Internet, telephony, or some other communication format—including combinations thereof. Wireless communication links 111 and 112 may comprise many different signals sharing the same link. For example, wireless communication links 111 and 112 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport media—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
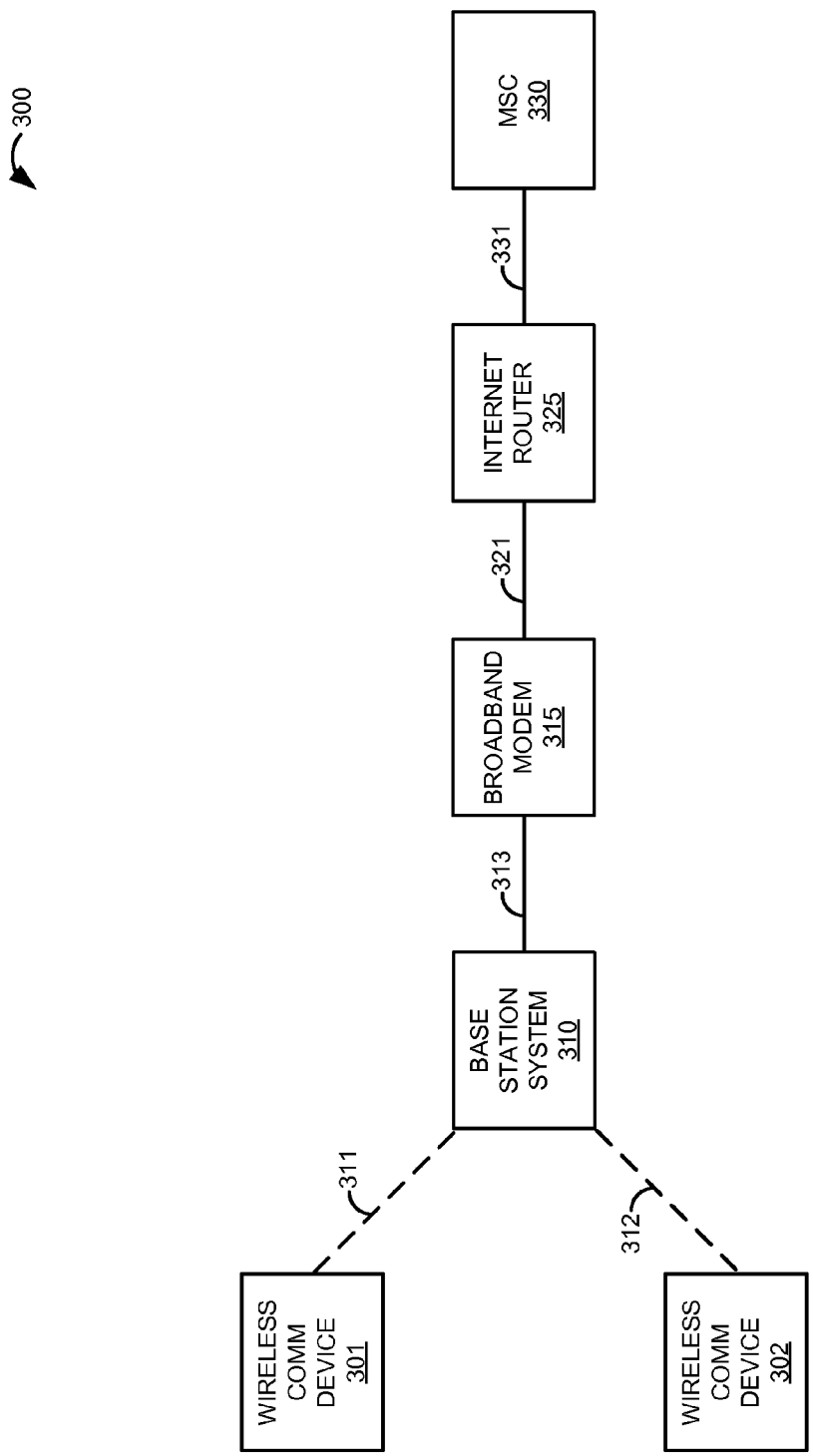
FIG. 3 is a block diagram that illustrates a communication system in an exemplary embodiment.

FIG. 3 is a block diagram that illustrates communication system 300 in an exemplary embodiment. Communication system 300 includes wireless communication devices 301-302, base station system 310, broadband modem 315, Internet router 325, and MSC 330. Wireless communication device 301 is in communication with base station system 310 over wireless communication link 311. Likewise, wireless communication device 302 is in communication with base station system 310 over wireless communication link 312. Base station system 310 communicates with broadband modem 315 over communication link 313. Broadband modem 315 is in communication with Internet router 325 over communication link 321. Internet router 325 communicates with MSC 330 over communication link 331.

Base station system 310 establishes communication connectivity with MSC 330 over a communication link. In this example, the communication link that base station system 310 uses to establish the communication connectivity with MSC 330 comprises communication links 313-331, broadband modem 315, and Internet router 325. In some variations, MSC 330 and broadband modem 315 are configured to communicate over the Internet via Internet router 325, and communication connectivity is established between base station system 310 and MSC 330 over the above-described communication link and the Internet.

After establishing communication connectivity, base station system 310 registers with MSC 330 and establishes a tunnel with MSC 330. In this example, the tunnel comprises a secure IP tunnel. Once the tunnel is established, base station system 310 exchanges user communications with a plurality of wireless communication devices 301-302 in a wireless protocol over wireless links 311-312 and exchanges the user communications with MSC 330 over the tunnel.

During the exchange of user communications, base station system 310 receives an IP layer three congestion notification indicator over the tunnel. The IP layer three congestion notification indicator is typically intended to inform an endpoint of communication congestion on Internet router 325 or communication links 321 or 331. However, the endpoints in communication system 300 comprise wireless communication devices 301 and 302, which only communicate in the wireless protocol. Thus, base station system 310 translates the IP layer three congestion notification indicator into the wireless protocol by generating a layer two congestion notification indicator in the wireless protocol and inserting the layer two congestion notification indicator into the second layer of the wireless protocol stack. Base station system 310 then transfers the layer two congestion notification indicator to wireless communication device 301 and/or 302 in the wireless protocol.

In some examples, the tunnel comprises a first active flow to wireless communication device 301 and a second active flow to wireless communication device 302. In this case, base station system 310 may receive the IP layer three congestion notification indicator in the first active flow to wireless communication device 301, but transfer the layer two congestion notification indicator in the wireless protocol to wireless communication device 302. In other words, although base station system 310 receives the IP layer three congestion notification indicator in the first active flow to wireless communication device 301, base station system 310 does not transfer the layer two congestion notification indicator to wireless communication device 301. This may occur, for example, when a priority of wireless communication device 301, or an application executing on device 301, is higher than a priority associated with wireless communication device 302.

When a priority is associated with a wireless communication device 301-302, the device 301-302 may be configured to perform an action based on the priority of the wireless communication device in response to the layer two congestion notification indicator. In some examples, the priority of a wireless communication device 301-302 is determined based on an application priority of an application executing on the wireless communication device. The action typically comprises some response to the communication congestion, such as decreasing a transmission bandwidth of the user communications associated with the wireless communication device 301-302, or increasing the buffer size of the user communications. However, in some examples, the action taken by wireless communication device 301-302 may simply be to ignore the layer two congestion notification indicator.

The priority associated with wireless communication devices 301 and 302 could be determined in a number of ways. For example, a user of wireless communication device 301 could set the priority of specific devices 301-302 and applications capable of executing on devices 301-302. This may be achieved though a graphical user interface (GUI) displayed on a device 301-302, or alternatively, base station system 310 could be configured to accept the priority settings through a prioritization GUI. In this case, a user would access base station system 310 with a wireless communication device 301-302 in order to display the GUI and configure the priorities. Base station system 310 could then determine dynamically which devices 301-302 to transfer the layer two congestion notification indicator to based on the priorities of the devices 301-302 and/or the priorities assigned to applications executing on these devices. In other examples, the priority associated with each wireless communication device 301-302 is determined based on default or predetermined priorities.

Figure 4:
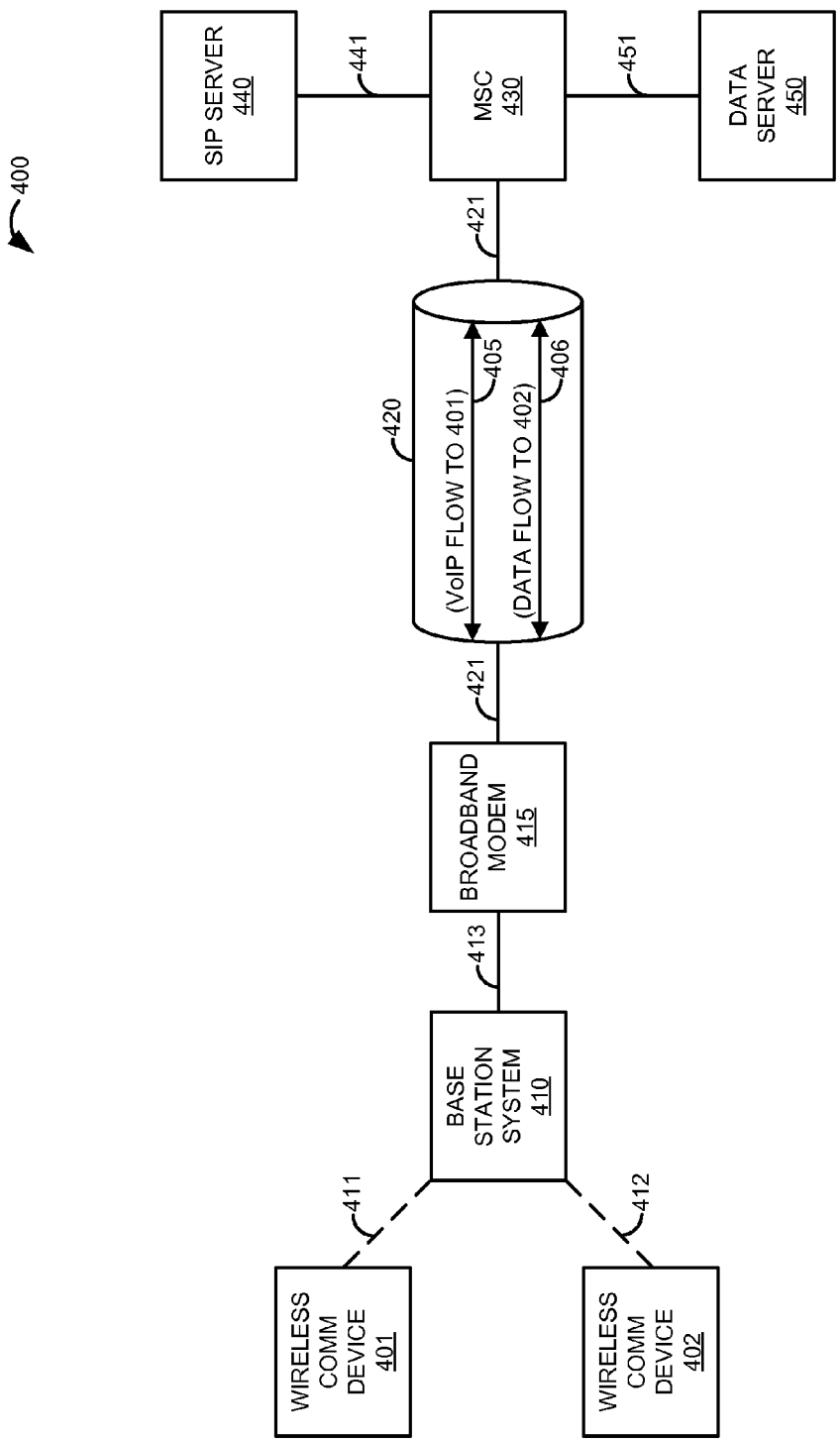
FIG. 4 is a block diagram that illustrates a communication system in an exemplary embodiment.

FIG. 4 is a block diagram that illustrates communication system 400 in an exemplary embodiment. Communication system 400 includes wireless communication devices 401-402, base station system 410, broadband modem 415, tunnel 420, MSC 430, Session Initiation Protocol (SIP) server 440, and data server 450. Wireless communication device 401 is in communication with base station system 410 over wireless communication link 411. Likewise, wireless communication device 402 is in communication with base station system 410 over wireless communication link 412. Base station system 410 communicates with broadband modem 415 over communication link 413. Broadband modem 415 is in communication with MSC 430 over communication link 421 and tunnel 420. MSC is in communication with SIP server 440 over communication link 441, and in communication with data server 450 over communication link 451. In the exemplary embodiment of communication system 400 shown in FIG. 4, base station system 410 comprises a femtocell, and wireless communication devices 401-402 communicate with the femtocell using the EV-DO wireless communication protocol.

Via broadband modem 415, base station system 410 establishes communication connectivity with MSC 430 over communication link 421, registers with MSC 430 over communication link 421, and establishes a tunnel 420 with MSC 430 over the communication link 421. As shown in FIG. 4, the tunnel 420 comprises an active Voice over Internet Protocol (VoIP) flow 405 to wireless communication device 401, and an active data flow 406 to wireless communication device 402. The VoIP flow 405 to device 401 is provided by SIP server 440 via MSC 430, and the data flow 406 to device 402 is provided by data server 450 via MSC 430. The data flow could comprise any active data transmission flow, such as a streaming video or gaming application, for example.

Base station system 410 exchanges user communications with wireless communication devices 401 and 402 and exchanges the user communications with MSC 430 over tunnel 420. During the exchange of the user communications, base station system 410 receives an IP layer three congestion notification indicator over tunnel 420. The IP layer three congestion notification indicator is received by base station system 410 in the active VoIP flow 405 to wireless communication device 401.

Upon receiving the IP layer three congestion notification indicator in the active VoIP flow 405, base station system 410 processes the IP layer three congestion notification indicator to generate a layer two congestion notification indicator in the EV-DO wireless protocol. However, although the IP layer three congestion notification indicator was received in the active VoIP flow 405 to device 401, base station system 410 is configured to transfer the layer two congestion notification indicator in the EV-DO wireless protocol to wireless communication device 402. To achieve this, base station system 410 inserts the layer two congestion notification indicator into the media access control (MAC) layer of the EV-DO protocol stack of the user communications exchanged with wireless communication device 402.

In some examples, base station system 410 transfers the layer two congestion notification indicator in the EV-DO wireless protocol only to wireless communication device 402 based on the active VoIP flow 405 having a higher priority than the active data flow 406 to device 402. This may occur due to base station system 410 being pre-configured to prioritize the active VoIP data flow 405 higher than the active data flow 406, due to user priority settings, or based on wireless communication device 401 having a higher priority than device 402, for example. In any event, base station system 410 is configured to not transfer the layer two congestion notification indicator to device 401 while receiving the active VoIP flow 405, thereby preserving call audio quality and avoiding a dropped VoIP call.

In examples where the IP layer three congestion notification indicator comprises an ECN bit, the congestion detection described herein can be achieved through the Real-time Transport Protocol (RTP) Control Protocol (RTCP) and the RTCP Extended Reports (RTCP XR) VoIP management protocol. Further, in examples where broadband modem 415 comprises a Data Over Cable Service Interface Specification (DOCSIS) compliant cable modem, PacketCable multimedia (PCMM) may be used to ensure that the ISP or a boarder device of the ISP does not conflict with the reception, translation, and transmission of the congestion notification indicators by base station system 410. To achieve this, a wireless communication service provider of wireless communication device 401 or 402 can configure a policy server to interact with the point coordination function (PCF) of the PCMM policy server on the cable network to set up a dynamic service flow for RTP and a default service flow for SIP when ECN is detected on the outer portion of tunnel 420.

Advantageously, base station system 410 is configured to receive the IP layer three congestion notification indicator over the tunnel and generate a layer two congestion notification indicator in the EV-DO protocol for insertion into the MAC layer of the EV-DO protocol stack. In this manner, the endpoints comprising wireless communication devices 401-402 may receive notice of the congestion. In the case of wireless communication device 401 receiving the active VoIP flow 405, the audio quality will not be affected by the active data flow 406 received by device 402, since device 402 will receive the layer two congestion notification indicator from base station system 410 and may throttle back the requested rate of data flow 406 in response. In this manner, the highest available quality of service is ensured for wireless communication device 401 when receiving VoIP flow 405.

Figure 5:
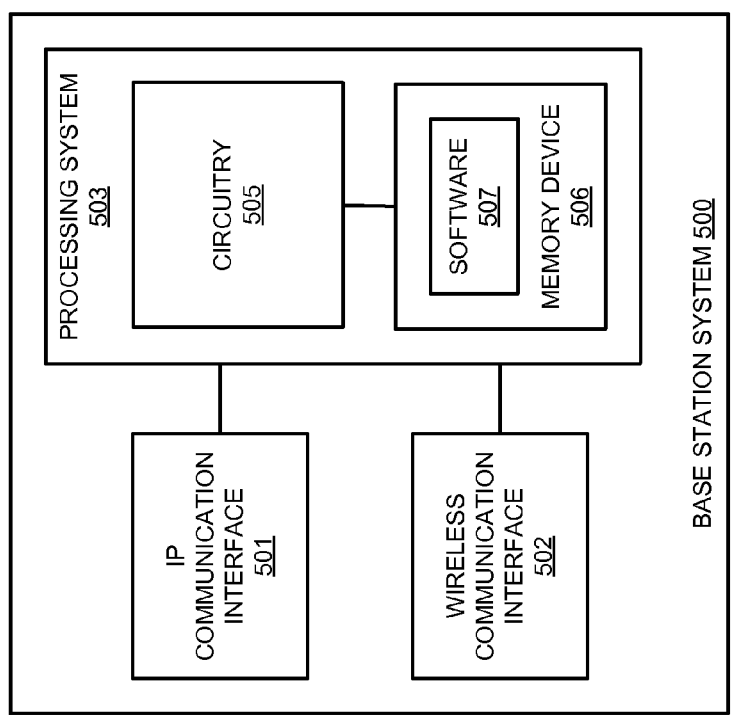
FIG. 5 is a block diagram that illustrates a base station system.

FIG. 5 is a block diagram that illustrates base station system 500. Base station system 500 provides an example of base station system 110, although system 110 may use alternative configurations. Base station system 500 comprises IP communication interface 501, wireless communication interface 502, and processing system 503. Processing system 503 is linked to IP communication interface 501 and wireless communication interface 502. Processing system 503 includes processing circuitry 505 and memory device 506 that stores operating software 507.

IP communication interface 501 comprises components that communicate over communication links, such as network cards, ports, RF transceivers, processing circuitry and software, or some other communication components. IP communication interface 501 may be configured to communicate over metallic, wireless, or optical links. IP communication interface 501 may be configured to use TDM, IP, Ethernet, optical networking, wireless protocols, communication signaling, or some other communication format—including combinations thereof. IP communication interface 501 may be configured to establish communication connectivity over a communication link to a service node on a communication network, register with the service node over the communication link and the communication network, and establish a tunnel with the service node over the communication link and the communication network. Further, IP communication interface 501 may be configured to exchange user communications with the service node over the tunnel, and receive an IP layer three congestion notification indicator over the tunnel.

Wireless communication interface 502 comprises RF communication circuitry and an antenna. The RF communication circuitry typically includes an amplifier, filter, RF modulator, and signal processing circuitry. Wireless communication interface 502 may also include a memory device, software, processing circuitry, or some other communication device. Wireless communication interface 502 may use various protocols, such as CDMA, GSM, UMTS, HSPA, EV-DO, EV-DO rev. A, 3GPP LTE, WiMAX, Wi-Fi, or some other wireless communication format. Wireless communication interface 502 may be configured to exchange user communications with a plurality of wireless communication devices in a wireless protocol. Further, wireless communication interface 502 may be configured to transfer a layer two congestion notification indicator in the wireless protocol to at least one wireless communication device of the plurality of wireless communication devices.

Processing circuitry 505 comprises microprocessor and other circuitry that retrieves and executes operating software 507 from memory device 506. Memory device 506 comprises a disk drive, flash drive, data storage circuitry, or some other memory apparatus. Processing circuitry 505 is typically mounted on a circuit board that may also hold memory device 506 and portions of IP communication interface 501 and wireless communication interface 502. Operating software 507 comprises computer programs, firmware, or some other form of machine-readable processing instructions. Operating software 507 may include an operating system, utilities, drivers, network interfaces, applications, or some other type of software. When executed by circuitry 505, operating software 507 directs processing system 503 to operate base station system 500 as described herein for base station systems 110, 310, and 410.

In particular, operating software 507 directs processing system 503 to direct IP communication interface 501 to establish communication connectivity over a communication link to a service node on a communication network, register with the service node over the communication link and the communication network, and establish a tunnel with the service node over the communication link and the communication network. Further, operating software 507 directs processing system 503 to direct wireless communication interface 503 to exchange user communications with a plurality of wireless communication devices in a wireless protocol. Operating software 507 directs processing system 503 to direct IP communication interface 501 to exchange the user communications with the service node over the tunnel and receive an IP layer three congestion notification indicator over the tunnel. Further, operating software 507 directs processing system 503 to process the IP layer three congestion notification indicator to generate a layer two congestion notification indicator in the wireless protocol, and direct wireless communication interface 502 to transfer the layer two congestion notification indicator in the wireless protocol to at least one wireless communication device of the plurality of wireless communication devices.

Figure 6:
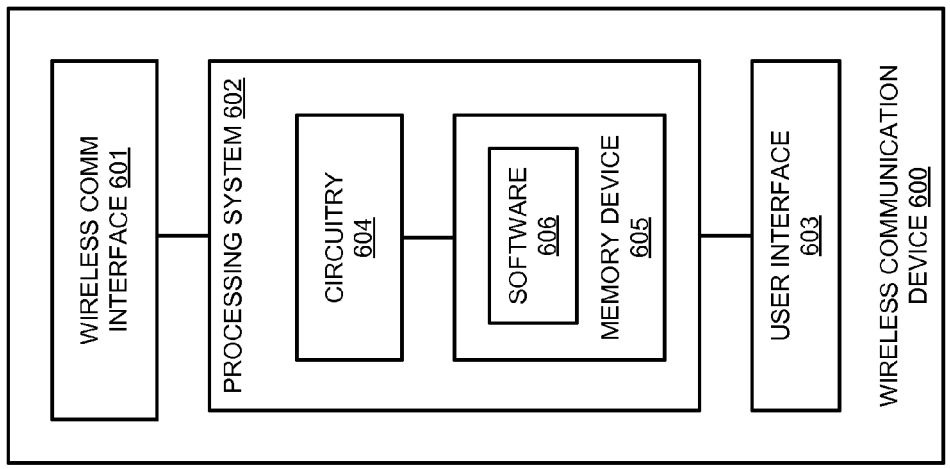
FIG. 6 is a block diagram that illustrates a wireless communication device.

FIG. 6 is a block diagram that illustrates wireless communication device 600. Wireless communication device 600 provides an example of wireless communication devices 101-102, although devices 101-102 could use alternative configurations. Wireless communication device 600 comprises wireless communication interface 601, processing system 602, and user interface 603. Processing system 602 is linked to wireless communication interface 601 and user interface 603. Processing system 602 includes processing circuitry 604 and memory device 605 that stores operating software 606. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, GSM, UMTS, HSPA, EV-DO, EV-DO rev. A, 3GPP LTE, WiMAX, Wi-Fi, or some other wireless communication format. Wireless communication interface 601 may be configured to exchange user communications with a base station system in a wireless protocol, and to receive a layer two congestion notification indicator in the wireless protocol from the base station system.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 may be omitted in some examples.

Processing circuitry 604 comprises microprocessor and other circuitry that retrieves and executes operating software 606 from memory device 605. Memory device 605 comprises a disk drive, flash drive, data storage circuitry, or some other memory apparatus. Processing circuitry 604 is typically mounted on a circuit board that may also hold memory device 605 and portions of communication interface 601 and user interface 603. Operating software 606 comprises computer programs, firmware, or some other form of machine-readable processing instructions. Operating software 606 may include an operating system, utilities, drivers, network interfaces, applications, or some other type of software. When executed by processing circuitry 604, operating software 606 directs processing system 602 to operate wireless communication device 600 as described herein for wireless communication devices 101, 102, 301, 302, 401, and 402. In particular, operating software 606 directs processing system 602 to direct wireless communication interface 601 to exchange user communications with a base station system and receive a layer two congestion notification indicator in a wireless protocol from the base station system. Further, operating software 606 may direct processing system 602 to perform an action based on a priority of wireless communication device 600 in response to the layer two congestion notification indicator.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A base station system comprising:
a processing system, an internet protocol (IP) communication interface, and a wireless communication interface, wherein the processing system is configured to direct the IP communication interface to establish communication connectivity over a communication link to a service node on a communication network, register with the service node over the communication link and the communication network, and establish a tunnel with the service node over the communication link and the communication network, wherein the base station system comprises a femtocell;
the processing system further configured to direct the wireless communication interface to exchange user communications with a plurality of wireless communication devices in a wireless protocol and direct the IP communication interface to exchange the user communications with the service node over the tunnel and receive an IP layer three congestion notification indicator over the tunnel; and the processing system further configured to translate the IP layer three congestion notification indicator to a layer two congestion notification indicator in the wireless protocol, and direct the wireless communication interface to transfer the layer two congestion notification indicator in the wireless protocol to at least one wireless communication device of the plurality of wireless communication devices.

2. The system of claim 1 wherein the tunnel comprises a first active flow to a first wireless communication device and a second active flow to a second wireless communication device of the plurality of wireless communication devices, and the IP communication interface receives the IP layer three congestion notification indicator in the first active flow to the first wireless communication device but transfers the layer two congestion notification indicator in the wireless protocol to the second wireless communication device.

3. The system of claim 1 wherein the tunnel comprises a first active flow to a first wireless communication device and a second active flow to a second wireless communication device of the plurality of wireless communication devices, and the IP communication interface receives the IP layer three congestion notification indicator in the first active flow to the first wireless communication device but does not transfer the layer two congestion notification indicator in the wireless protocol to the first wireless communication device.

4. The system of claim 1 wherein the at least one wireless communication device is configured to, in response to the layer two congestion notification indicator, perform an action based on a priority of the wireless communication device.

5. The system of claim 4 wherein the priority of the wireless communication device is determined based on an application priority of an application executing on the wireless communication device.

6. The system of claim 4 wherein the action comprises decreasing a transmission bandwidth of the user communications associated with the wireless communication device.

7. The system of claim 4 wherein the action comprises ignoring the layer two congestion notification indicator.

8. The system of claim 1 wherein the processing system, to translate the layer three congestion notification to the layer two congestion notification indicator in the wireless protocol, comprises inserting the layer two congestion notification indicator into a link layer.

9. The system of claim 1 wherein the wireless protocol comprises an evolution data optimized (EV-DO) wireless communication protocol.

10. The system of claim 1 wherein the IP layer three congestion notification indicator comprises an explicit congestion notification (ECN).

11. A method of operating a base station system, the method comprising:
establishing communication connectivity over a communication link to a service node on a communication network;
registering with the service node over the communication link and the communication network;
establishing a tunnel with the service node over the communication link and the communication network;
exchanging user communications with a plurality of wireless communication devices in a wireless protocol and exchanging the user communications with the service node over the tunnel;

receiving an IP layer three congestion notification indicator over the tunnel;
translating the IP layer three congestion notification indicator to a layer two congestion notification indicator in the wireless protocol; and
transferring the layer two congestion notification indicator in the wireless protocol to at least one wireless communication device of the plurality of wireless communication devices.

12. The method of claim 11 wherein the tunnel comprises a first active flow to a first wireless communication device and a second active flow to a second wireless communication device of the plurality of wireless communication devices, receiving the IP layer three congestion notification indicator over the tunnel comprises receiving the IP layer three congestion notification indicator in the first active flow to the first wireless communication device, and transferring the layer two congestion notification indicator comprises transferring the layer two congestion notification indicator in the wireless protocol to the second wireless communication device.

13. The method of claim 11 wherein the tunnel comprises a first active flow to a first wireless communication device and a second active flow to a second wireless communication device of the plurality of wireless communication devices, receiving the IP layer three congestion notification indicator over the tunnel comprises receiving the IP layer three congestion notification indicator in the first active flow to the first wireless communication device, and transferring the layer two congestion notification indicator comprises not transferring the layer two congestion notification indicator in the wireless protocol to the first wireless communication device.

14. The method of claim 11 wherein the at least one wireless communication device is configured to, in response to the layer two congestion notification indicator, perform an action based on a priority of the wireless communication device.

15. The method of claim 14 wherein the priority of the wireless communication device is determined based on an application priority of an application executing on the wireless communication device.

16. The method of claim 14 wherein the action comprises decreasing a transmission bandwidth of the user communications associated with the wireless communication device.

17. The method of claim 11 wherein processing the IP layer three congestion notification indicator to translate the layer two congestion notification indicator in the wireless protocol comprises inserting the layer two congestion notification indicator into a link layer.

18. The method of claim 11 wherein the wireless protocol comprises an evolution data optimized (EV-DO) wireless communication protocol.

19. The method of claim 11 wherein the base station system comprises a femtocell.

20. A base station system comprising:
a processing system, an internet protocol (IP) communication interface, and a wireless communication interface, wherein the processing system is configured to direct the IP communication interface to establish communication connectivity over a communication link to a service node on a communication network, register with the service node over the communication link and the communication network, and establish a tunnel with the service node over the communication link and the communication network, wherein the tunnel comprises an active voice over internet protocol (VoIP) flow to a first wireless communication device of a plurality of wireless communication devices and an active data flow to a second wireless communication device of the plurality of wireless communication devices;

the processing system further configured to direct the wireless communication interface to exchange user communications with the plurality of wireless communication devices in a wireless protocol and direct the IP communication interface to exchange the user communications with the service node over the tunnel and receive an IP layer three congestion notification indicator over the tunnel, wherein the IP communication interface receives the IP layer three congestion notification indicator in the active VoIP flow to the first wireless communication device; and the processing system further configured to translate the IP layer three congestion notification indicator to a layer two congestion notification indicator in the wireless protocol, and direct the wireless communication interface to transfer the layer two congestion notification indicator in the wireless protocol to the second wireless communication device.

* * * * *